United States Patent [19]
Welner et al.

[11] Patent Number: 5,509,064
[45] Date of Patent: Apr. 16, 1996

[54] CALL ROUTING AND HANDLING SYSTEM FOR CONVEYING CONFIDENTIAL MEDICAL TEST RESULT INFORMATION TO ANONYMOUS CALLERS

[75] Inventors: Stephen Welner, Martinsville; Elliot Millenson; Wendy Strongin, both of Far Hills, all of N.J.

[73] Assignee: Ortho Pharmaceutical Corporation, Raritan, N.J.

[21] Appl. No.: 366,796

[22] Filed: Dec. 30, 1994

[51] Int. Cl.⁶ .............................. H04M 3/00; H04M 1/64; H04M 11/00; H04Q 3/64

[52] U.S. Cl. .............................. 379/265; 379/67; 379/97; 379/196; 379/212; 379/309

[58] Field of Search ................................ 379/52, 67, 88, 379/89, 196, 211, 212, 265, 309, 97

[56] References Cited

U.S. PATENT DOCUMENTS

4,847,890  7/1989  Solomon et al. ................... 379/196 X

*Primary Examiner*—Jeffery Hofsass
*Assistant Examiner*—Harry S. Hong
*Attorney, Agent, or Firm*—Paul A. Coletti

[57] ABSTRACT

A method and apparatus for routing and handling a plurality of in-coming telephone calls initiated by a plurality of anonymous callers, each of the anonymous callers having previously provided a specimen for evaluation to a medical testing laboratory. A telephone call initiated by an anonymous caller is received by the call routing and handling system. The anonymous caller is prompted by the call routing and handling system to transmit a personal identification code corresponding to a specimen previously provided to the medical testing laboratory by the anonymous caller. The personal identification code transmitted by the anonymous caller is received by the call routing and handling system, and test result information associated with the specimen previously provided to the medical testing laboratory by the anonymous caller is retrieved based on the personal identification code previously received. A call handler for processing the telephone call is selected in response to the test result information. The selected call handler is chosen from a plurality of candidate call handlers. The telephone call is then routed to the selected call handler and test result information corresponding to the personal identification code previously received is provided to the anonymous caller by the selected call handler.

17 Claims, 5 Drawing Sheets

CALL ROUTING AND HANDLING SYSTEM FOR CONVEYING CONFIDENTIAL MEDICAL TEST RESULT INFORMATION TO ANONYMOUS CALLERS

BACKGROUND OF THE INVENTION

The present invention relates generally to systems for routing and handling in-coming telephone calls. More particularly, the present invention is directed to a call routing and handling system for conveying confidential medical test result information to anonymous callers. Still more particularly, the present invention relates to a call routing and handling system for use with a confidential in-home test kit to be used by a consumer to test for the presence of the HIV virus (human immunodeficiency virus) which is known to cause AIDS (Acquired Immune Deficiency Syndrome).

AIDS is viewed by many as the single most serious modern-day health issue affecting society. Since there is presently no known cure for the disease, early detection and treatment of the HIV virus provides the best chance of helping a patient to prolong his or her life by delaying onset of the disease. In addition, early detection is crucial to preventing the spread of the virus itself.

Although early detection of the virus is vitally important, only about 8% of adult Americans are tested annually. Individuals have been reluctant to submit to testing because, among other things, they fear that a positive test result will not be kept confidential. It is currently estimated that the number of at-risk individuals being tested for the HIV virus would increase to approximately 29% if a diagnostic procedure was available the could assure an individual's confidentiality.

The present invention relates to a confidential at-home test system for determining whether an individual may be carrying the HIV virus. An individual uses the at-home system by purchasing a test kit at a pharmacy or other retail outlet. The test kit contains a test card for carrying a sample of the individual's blood to a testing lab. The individual places several drops of his or her blood onto the test card while at home, and then mails the test card to a central laboratory for testing. Several days later, the individual then calls a central phone number to get his or her testing results and to receive counseling on the HIV virus and AIDs.

As mentioned above, it is vital that any HIV testing system have mechanisms for maintaining the anonymity of the individuals being tested. In addition, in order to maintain the effectiveness and integrity of a testing system such as the one described above, which may potentially involve the processing and handling of numerous test specimens by a testing lab, it is crucial that the system also have mechanisms for monitoring (i) whether an individual's test results have been reported to the individual and, if so, how many times, (ii) whether an individual has been counselled by the testing system and, if so, on what topics and how many times, and (iii) the length of time since the individual's test results were originally determined by the testing lab. In addition to monitoring these parameters, the testing system must also be able to deliver confidential test results and counselling to numerous individuals over the telephone in an efficient and cost-effective manner.

It is therefore an object of the present invention to provide an efficient and cost-effective system for delivering confidential HIV test results and counselling to numerous anonymous individuals.

It is a further object of the present invention to provide a system for delivering HIV test results that can be used in conjunction with a confidential at-home HIV testing kit.

It is a still further object of the present invention to provide a telephone call routing and handling system for delivering HIV test results and counseling to anonymous callers.

It is a still further object of the present invention to provide a telephone call routing and handling system for delivering HIV test results which routes and handles in-coming telephone calls based on test result information associated with each of the callers.

It is a still further object of the present invention to provide a telephone call routing and handling system for delivering HIV test results which routes and handles in-coming telephone calls in response to the length of time that has passed since a testing laboratory originally evaluated a specimen provided by each of the callers.

It is a still further object of the present invention to provide a telephone call routing and handling system for delivering HIV counseling which routes and handles in-coming telephone calls in response to previous information given to a caller by the system.

These and still other objects of the invention will become apparent upon study of the accompanying drawings and description of the invention.

SUMMARY OF THE INVENTION

The present invention is directed to a method and apparatus for routing and handling a plurality of incoming telephone calls initiated by a plurality of anonymous callers, each of the anonymous callers having previously provided a specimen for evaluation to a medical testing laboratory. Initially, a telephone call initiated by an anonymous caller is received by the call routing and handling system. The anonymous caller is prompted by the call routing and handling system to transmit a personal identification code corresponding to a specimen previously provided to the medical testing laboratory by the anonymous caller. Next, the personal identification code transmitted by the anonymous caller is received by the call routing and handling system, and test result information associated with the specimen previously provided to the medical testing laboratory by the anonymous caller is retrieved based on the personal identification code previously received. A call handler for processing the telephone call is selected in response to the test result information. The selected call handler is chosen from a plurality of candidate call handlers. The telephone call is then routed to the selected call handler and test result information corresponding to the personal identification code previously received is provided to the anonymous caller by the selected call handler.

DETAILED DESCRIPTION OF THE PREFERRED EMBODIMENT

Figure 1:
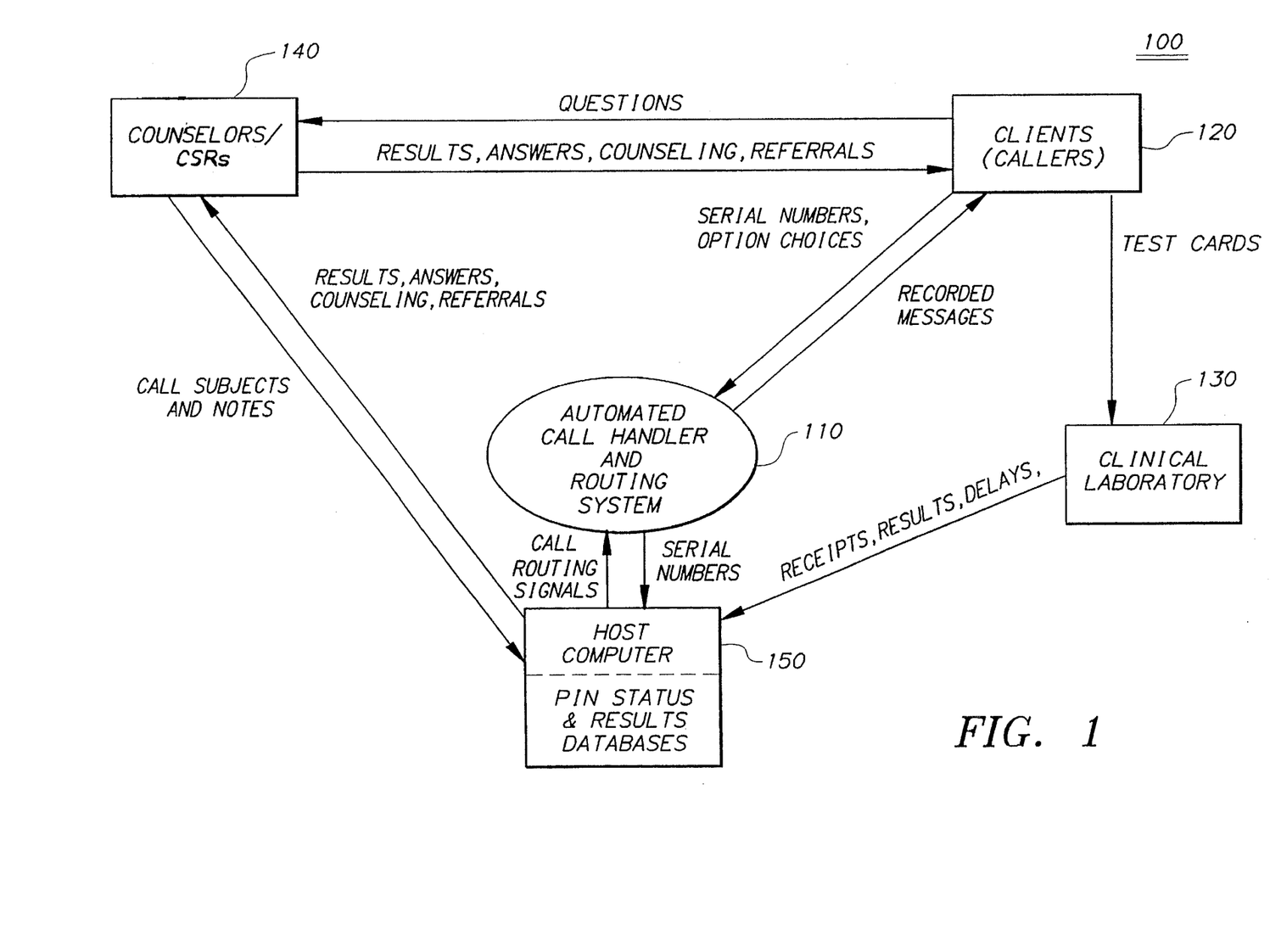
FIG. 1 shows a flow diagram illustrating the operation of a system for delivering confidential medical test results and counselling to clients in accordance with a preferred embodiment of the present invention.
Figure 2:
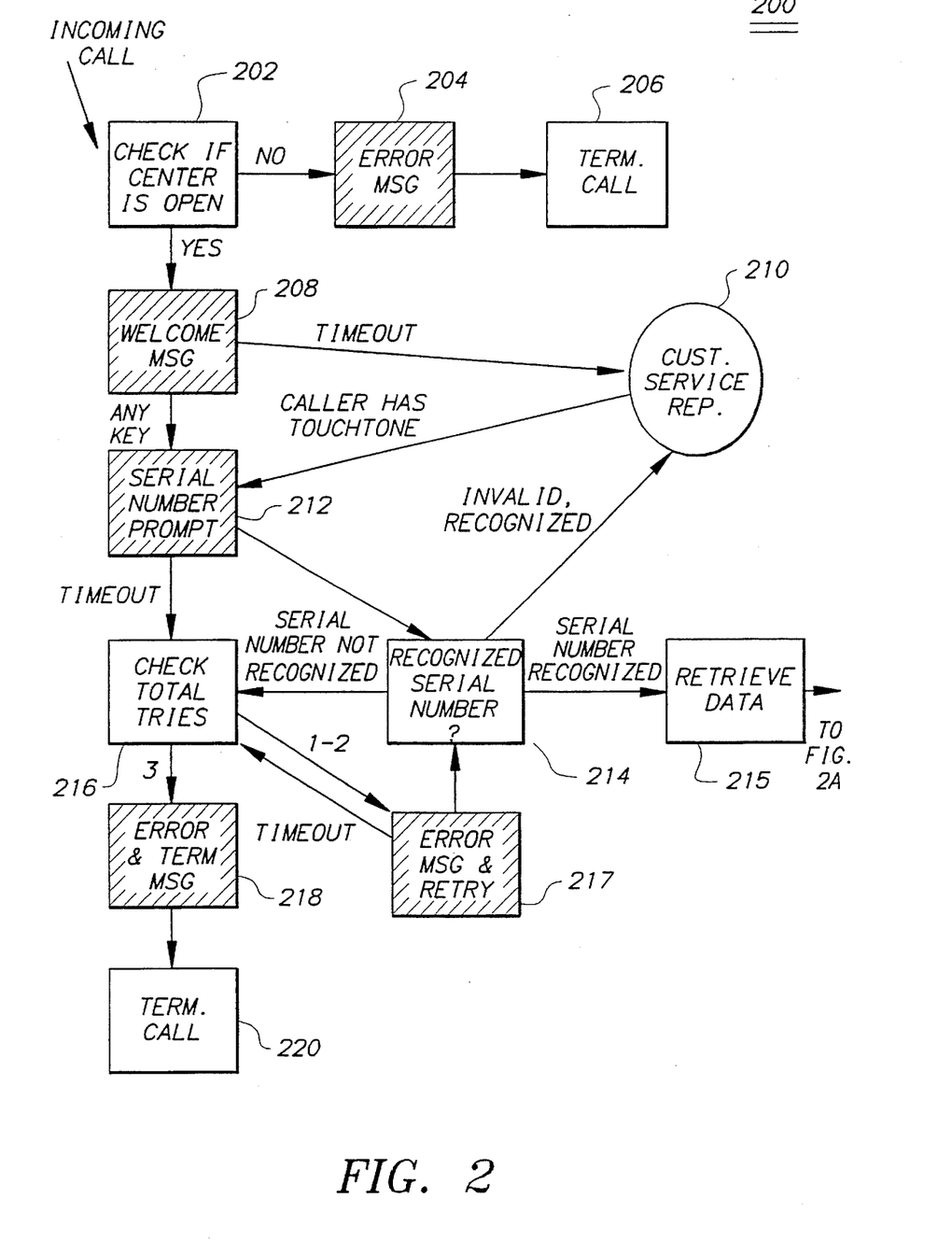
FIGS. 2, 2A, 2B and 2C show a flow diagram illustrating the operation of a system for routing and handling in-coming calls in accordance with a preferred embodiment of the present invention.
Figure 2A:
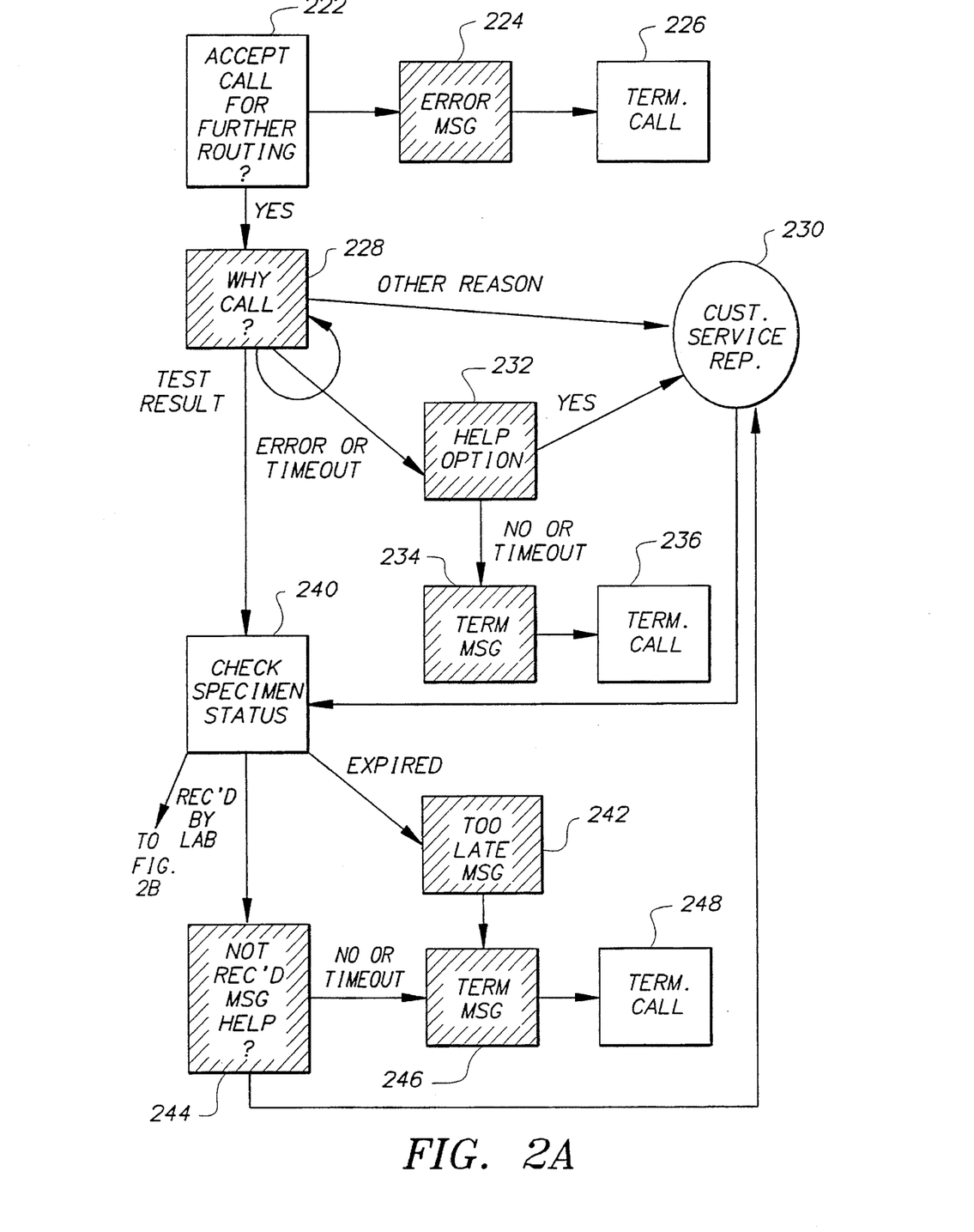
Figure 2B:
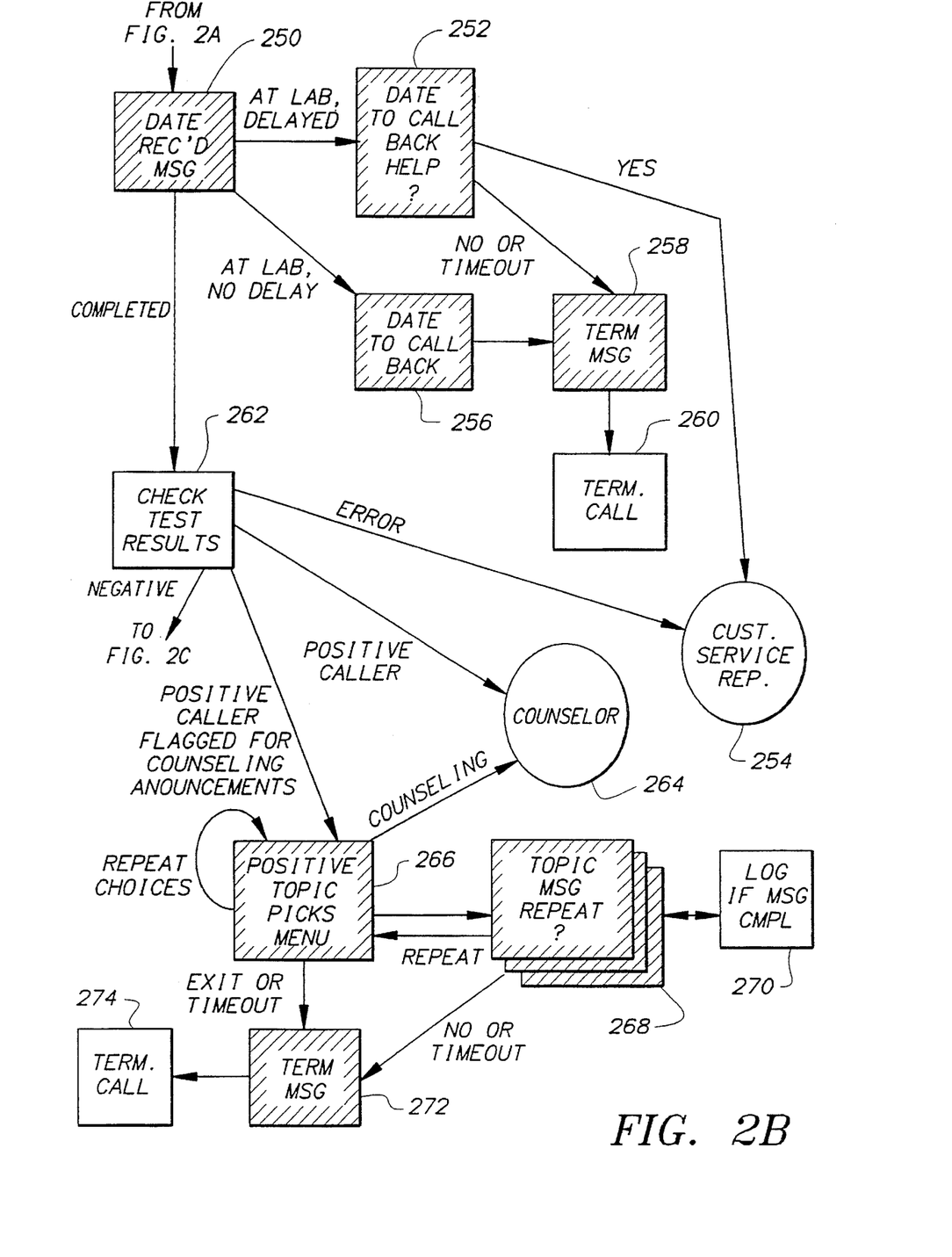
Figure 2C:
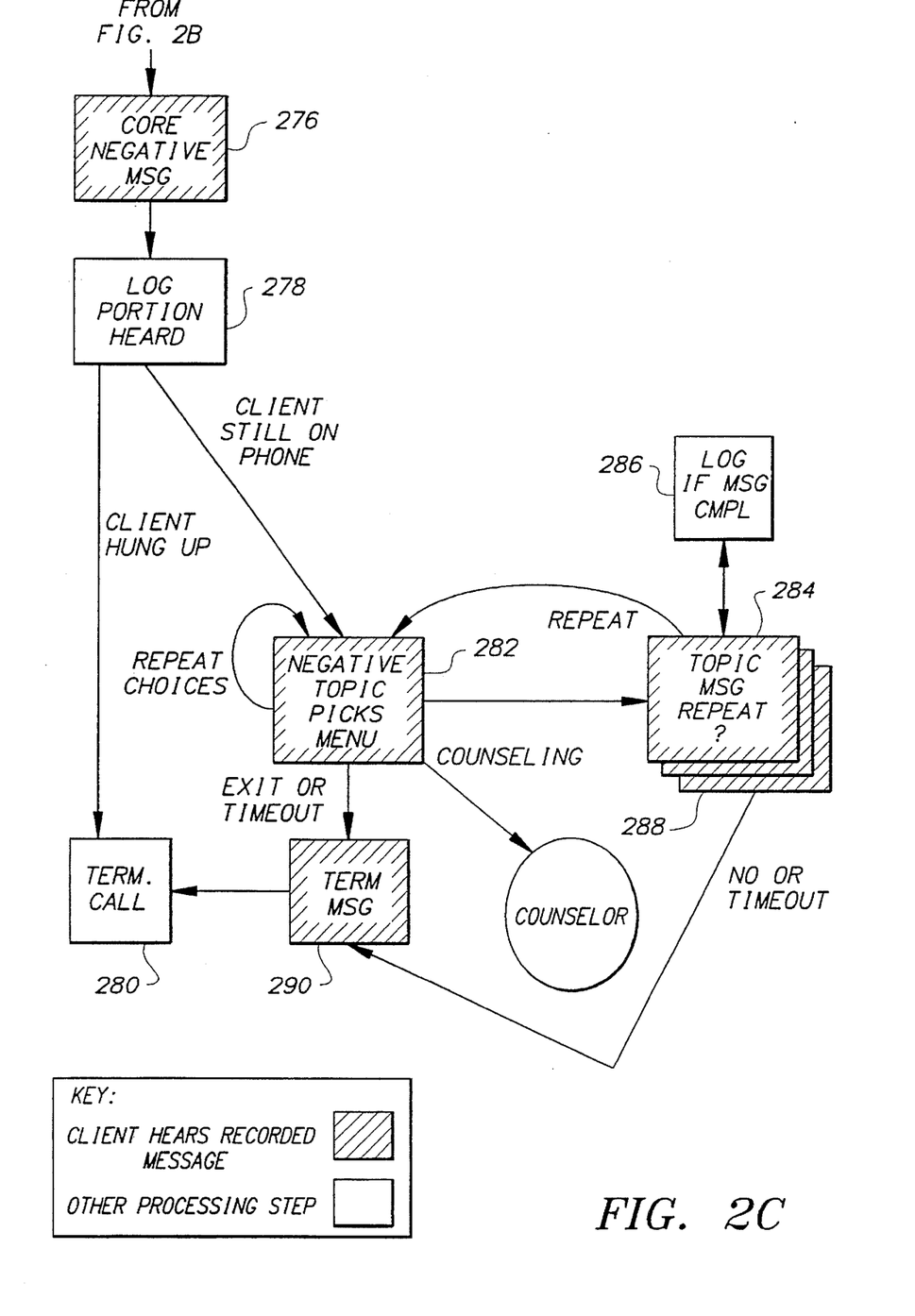

Referring now to FIG. 1, there is shown a flow diagram illustrating the operation of a system 100 for delivering confidential medical test results and counseling information to clients 120 in accordance with a preferred embodiment of the present invention. System 100 is designed for use in conjunction with an at-home HIV test kit (not shown) and, more particularly, system 100 is designed to provide HIV test results and counseling information to clients 120 who have previously purchased and used such an at-home HIV test kit to provide a specimen of their blood to testing laboratory 130. In accordance with the preferred embodiment, system 100 retrieves and provides test results and counselling to each individual client 120 based only a unique personal identification number associated with the client's at-home test kit. Significantly, the identity (e.g., name, address, telephone number) of each client 120 receiving test results and counseling from system 100 remains anonymous and is therefore never known to any aspect of system 100 (other than by the individual clients 120 themselves).

As mentioned above, the present invention is designed to be used in conjunction with a confidential at-home test system for determining whether an individual client 120 may be carrying the HIV virus. An individual client 120 desiring to use the at-home system purchases a test kit at a pharmacy or other retail outlet. The test kit contains a test card for carrying a sample (or specimen) of the client's blood to a testing laboratory 130. Each test card purchased by a client 120 has a unique multi-digit personal identification number (PIN) pre-printed on the card.

After purchasing a test kit, a client 120 places several drops of his or her blood onto the test card while at home, and then mails the test card to testing laboratory 130 for evaluation. Prior to mailing the test card to testing laboratory 130, the client 120 maintains a record of the PIN printed on his or her test card. As test cards are received and processed by testing laboratory 130, testing laboratory 130 provides digital signals representative of status information (i.e., whether a test card was received by the lab and if so the date and time of receipt, whether evaluation of the test card has been delayed, etc.) and result information (i.e., HIV positive, screen positive, HIV negative, error or inconclusive) to host computer 150 based on the preprinted PINs on the test cards received by testing laboratory 130. Host computer stores test card status information received from laboratory 130 in a PIN status database and test card result information received from laboratory 130 in a test card results database.

Upon learning of the receipt of a test card by testing laboratory 130, host computer 150 will automatically generate and store in its PIN status database a date and time that test results for the card should be available from the testing laboratory 130. In the event that the testing laboratory 130 indicates to host computer 150 that there will be a delay in providing a test result for a particular test card, testing lab 130 will preferably provide host computer 150 with an expected period of delay. The expected delay period will also be stored in the PIN status database associated with host computer 150.

Several days after a client 120 mails his or her test card to testing laboratory 130, the client 120 places a telephone call to automated call handler and routing system 110 to obtain his or her testing results and/or to receive counseling on the HIV virus and AIDs. During the course of the telephone call, the client 120 never reveals his or her identity, but instead receives his or her test results and counseling by providing only his or her unique PIN to automated call handler and routing system 110.

In accordance with the preferred embodiment, automated call handler and routing system 110 facilitates the providing of test result and counseling information to clients 120 either via recorded messages, or through live counselors and/or customer service representatives (CSRs) 140. Recorded messages are preferably used by call handler and routing system 110 for informing a client 120 of negative test results. Alternatively, in the case of clients 120 that test positive or screen positive for the HIV virus, or whose test results are inconclusive, call handler and routing system 110 transfers the client-callers 120 to live counselors 140 who then inform clients 120 of their test results. In cases where the test results for the client-caller 120 are not yet available because testing laboratory has not completed its evaluation of the test card associated with the client-caller 120, call handler and routing system 110 transfers the client-caller 120 to the automated call handler (within system 110) which plays a recorded message for the client-caller 120 indicating the date the client-caller 120 should call back to obtain his or her test result information.

In order to be able to promptly handle and route incoming calls from clients 120 as such calls are received, automated call handler and routing system 110 is coupled to host computer 150 which maintains current databases reflecting test result and status information associated with each test card received by testing laboratory 130. These databases maintain such test result and status information for each test card by associating all information pertaining to the test card with the PIN that was pre-printed on the test card. Testing laboratory 130 and host computer 150 are preferably coupled by a dedicated modem line, and, on a regular basis, testing laboratory 130 provides host computer 150 with current status and result information for all test cards received and being processed by testing laboratory 130. In the preferred embodiment, testing laboratory 130 provides updated status and result information to host computer 150 on an hourly basis.

Automated call handler and routing system 110 is preferably comprised of a programmable automated call distributor/voice response unit (ACD/VRU), such as that manufactured by the Aspect Corporation under model number 100. In addition, call handling and routing system 110 is preferably coupled to host computer system 150 which maintains test result and status information, as well other information including a list of valid PINs, records of previous calls placed to system 110 by clients 120, and a comprehensive database of referral organization information relating to the HIV virus and AIDs provided by the U.S. Centers for Disease Control. As explained more fully below, call handler and routing system 110 initially provides a series of automated messages to client-callers 120 who have tested HIV negative, repeat client-callers 120 who have already been informed (during a previous call) of a positive test result and who were flagged during a previous call to receive counselling announcments, and client-callers 120 for whom test results are not available. Client-callers 120 who have tested positive or screen positive for the HIV virus, or whose test results were inconclusive, are transferred by call routing and handling system 110 to a counselor 140. Client-callers placing calls to call handler and routing system 110 in order to obtain general information about the at-home test kit or for other reasons are transferred by call handler and routing system 110 to a CSR for handling.

By way of an overview, a client-caller 120 who has mailed a specimen to testing laboratory 130 may request information about his or her test results or about HIV or AIDs by placing a call to call handler and routing system 110. After receiving the in-coming call, call handler and routing system 110 will automatically prompt the client-caller 120 to supply the unique PIN from his or her test card to system 110 via the touch-tone buttons on the telephone of client-caller 120. Upon receipt of the PIN, call handler and routing system 110 will transmit a signal representative of the PIN to host computer 150. Host computer 150 will then attempt to recognize the PIN and retrieve status information associated with the PIN from its PIN status database. If the PIN supplied by client-caller 120 is not listed on the PIN status database in host computer 150, the PIN will not be recognized and the caller will either be given a further opportunity to enter a recognizable PIN or the call will be terminated. If the PIN supplied by client-caller 120 is recognized by host computer 150 but its status is invalid, system 110 automatically transfers the call to a CSR 140 for handling. Alternatively, if the PIN supplied by the client-caller 120 is recognized by host computer 150 and has a valid status, system 110 automatically prompts the client-caller 120 to enter (via the touch-tone buttons on the telephone of the caller) a number corresponding to the reason why the client-caller 120 has placed the call to system 110. If the reason for the call is the desire of client-caller 120 to obtain test result information associated with his or her blood specimen, host computer 150 accesses its PIN status database to determine whether the test card of client-caller 120 was ever received by testing laboratory 130. If the test card was received by the testing laboratory 130 and an evaluation of the test card has been completed by the testing laboratory, host computer 150 accesses its results database to retrieve the test results (either HIV positive, screen positive, HIV negative, inconclusive or error) associated with the PIN entered by the client-caller 120. If the test results indicate an HIV negative condition, call handler and routing system 110 transfers the call to the automated call handler (within system 110) which plays an automated message for the client-caller 120 indicating that he or she has tested negative for the HIV virus. Alternatively, if the test results indicate an HIV positive, screen positive or inconclusive condition, call handler and routing system 110 transfers the call to a live counselor 140 who then informs the client-caller 120 of his or her test results. In addition to providing test result information, the counselor 140 provides the client-caller 120 with information and answers to questions about the HIV virus and AIDs posed by the client-caller 120, as well as referral data retrieved from the database of referral organization information (not shown but stored on host computer 150) which contains the names, addresses and phone numbers of individuals and organizations that can provide additional information to client-callers 120 who have tested positive for the HIV virus.

For each calling session in which a client-caller speaks with either a counselor or a CSR, the counselor or CSR handling the call will record data reflecting subjects or areas discussed during the call. Potential subjects for discussion during a typical call include questions about the at-home test kit and its use, requests for test results, the furnishing of test results, the furnishing of referrals, and the furnishing of counseling on a variety of topics. Data reflecting the topics discussed during the call will be stored (together with the time, date and length of the call) in a call history database (not shown) in host computer 150. The call history database will store this call history information for each client-caller 120 by associating such information with the unique PIN printed on the test card of client-caller 120. In addition to information about the topics covered, date and time of the call, a counselor or CSR may also enter freeform notes about a call, and such notes will also be recorded and stored in the call history database in connection with the PIN of the client-caller 120. In addition, counselors that have conveyed positive test result information to a client-caller 120 may flag the client-caller 120 for "counselling announcements" in the event the caller calls again. If the client-caller 120 is flagged for "counselling announcements", this flagging information will be stored with the client-caller's PIN in the PIN database and, in the event the client-caller calls again, the call will (as explained more fully below) be initially transferred to the automated call handler in system 110 for processing.

Referring now to FIGS. 2, 2A, 2B and 2C, there is shown a flow diagram illustrating the operation of a system 200 employed by call handler and router 110 for handling in-coming calls in accordance with a preferred embodiment of the present invention. Once an in-coming call is received by system 110, the first step in the call handling and routing process (step 202) is for call handler and router 110 to determine whether the center for processing the call is open. If a determination is made that the center is closed, processing will proceed to step 204 where the client-caller 120 will be transferred to the automated call handler (within system 110) which will play a recorded message stating that the center is closed and requesting the caller to call back during specific hours. After the automated call handler within system 110 has played this recorded message, the call is then terminated at step 206. Alternatively, if a determination is made that the center is open, processing will proceed to step 208 where the client-caller 120 will be provided with a recorded welcome message requesting the client-caller 120 to enter a "1" if he or she is calling from a touch-tone telephone. If the client-caller 120 has a touch-tone telephone and enters any digit in response to the welcome message, processing will proceed to step 212. If no digit is entered by the client-caller 120 in response to the welcome message within a predetermined amount of time, this will indicate that the client-caller 120 is likely calling from a rotary telephone. In the event that no digit is entered by the client-caller 120 within the predetermined amount of time, processing proceeds to step 210 where system 110 transfers the call to a live CSR 140 for further processing.

In step 212, automated call handler and router 110 plays a recorded message prompting the client-caller 120 to enter the unique PIN from the client-caller's test kit. Following the entry of a PIN by the client-caller 120 in step 212, processing proceeds to step 214 where a determination is made by host computer 150 as to whether the PIN that was entered is a recognized PIN. A PIN will be determined to be a recognized PIN by host computer 150 if the PIN is stored in the PIN status database within host computer 150.

If a determination is made in step 214 that the PIN entered by the client-caller 120 is in fact a recognized PIN, then processing proceeds to step 215. Alternatively, if a determination is made in step 214 that the PIN entered by the client-caller 120 is not recognized, then processing proceeds to step 216 where a determination is made regarding the number of times the client-caller 120 has attempted to enter a recognized PIN. If the client-caller 120 fails on his first or second attempt to enter a recognized PIN, then processing proceeds to step 217 where a recorded error message is played by system 110 and the client-caller 120 is asked again to enter his or her PIN. In the event that the client-caller 120 fails on three consecutive occasions to enter a recognized PIN, processing proceeds first to step 218 where a further error message is played by system 110 and then to step 220 where the call is terminated.

In step 215, all current data associated with the PIN entered by the client-caller 120 is retrieved by host computer 150 from its PIN status and results databases. Such data includes any PIN status and test result information associated with the PIN, as well as any call history data reflecting previous calls placed to call handler and router 110 by the client-caller 120. Following the retrieval of this data, processing proceeds to step 222, where a determination is made as to whether the in-coming call will be accepted for further routing. In the preferred embodiment, an in-coming call will be rejected for further routing at step 222 if the PIN status data retrieved in step 215 indicates that the client-caller 120 has been threatening or abusive during past calls. In addition, an in-coming call will be rejected at step 222 if the PIN status data indicates that the client-caller 120 has tested HIV negative and has already been given his test results repeatedly during previous calls to the system. In the preferred embodiment, a client-caller 120 may call in only twice to receive a negative test result. In the event that a determination is made to reject an in-coming call in step 222, processing proceeds to step 224 where a recorded message is played by system 110 stating that result information and customer service is no longer available for the client-caller's PIN. In addition, in the event that the client-caller 120 has exceeded the maximum number of times for receiving his or her test results, a recorded message will also be played by system 110 during step 224 indicating the last date and time that test result information was provided to the client-caller 120. Following the playing of these messages in step 224, processing will proceed to step 226 where the in-coming call will be terminated.

As part of step 222, the present invention also determines whether the PIN entered by the client-caller 120 in response to step 212 represents a valid PIN. This determination is made by host computer 150 based on the PIN status information retrieved in step 215. The PIN status information will indicate, for example, whether the test kit associated with the PIN was ever released for sale to the public. In the preferred embodiment, the PIN status database will list as valid only those PINs corresponding to test kits which were previously shipped by a test kit assembler to pharmacies and other retail outlets. A suitable system for maintaining a list valid of PINs is described in U.S. patent application Ser. No. 08/366,785 (unknown), filed simultaneously herewith, and entitled "System for Tracking Medical Test Cards," the contents of which is hereby incorporated in its entirety herein by reference. In the event that the PIN entered by the client-caller 120 is not listed as having a valid status in the PIN status database, an INVALID PIN call routing signal is transmitted from host computer 150 to system 110. In response to this INVALID PIN call routing signal, system 110 transfers the call to a CSR 140 for further handling.

If the PIN entered by client-caller 120 is valid and the call is accepted for further routing in step 222, processing proceeds to step 228 where a determination is made as to the reason for the call. In step 228, system 110 plays a recorded message requesting the client-caller 120 to enter the reason for the call. In the preferred embodiment of the present invention, there will be two possible choices: (1) to obtain test results, or (2) for any other reason. If the client-caller 120 enters a "1" indicating that he or she is calling to obtain test result information, processing proceeds to step 240. If the client-caller 120 enters a "2" indicating that he or she is calling for some other reason, processing proceeds to step 230 where system 110 transfers the call to a CSR for further handling. In the event that a client-caller 120 enters an invalid selection in step 228 (i.e., the client-caller enters a selection other than "1" or "2"), the client-caller 120 will be given a second opportunity to enter the reason for his or her call. If a valid selection is not entered during the second try, processing proceeds to step 232 where system 110 plays a recorded help message for the client-caller 120. If the client-caller 120 responds to the help message by requesting help within a predetermined amount of time, processing proceeds to step 230 where system 110 transfers the call to a CSR for further handling. In the event that the client-caller 120 does not request help in response to the help message played in step 232, processing proceeds first to step 234 where a recorded good-bye message is played by system 110 and then to step 236 where the call is terminated.

If the client-caller 120 indicated either in step 228 or during a conversation with a CSR in step 230 that the reason for his or her call was to obtain test result information, processing proceeds to step 240 where host computer 150 determines (based on the information previously retrieved in step 215) the condition of the client-caller's specimen. There are three possible conditions that may be associated with a client-caller's specimen in step 240: (1) the specimen test result has expired, (2) the specimen has not yet been received by testing laboratory 130, or (3) the specimen has been received by testing laboratory. A test result will automatically expire (and thereby rendered unavailable to the client-caller 120) a predetermined number of days after the test card of the client-caller 120 was processed by testing laboratory 130. Unlike other medical conditions, its often takes several months after a person has been exposed to the HIV virus for indications of the HIV virus to appear in that person's bloodstream. As a result, HIV test results may only be valid for a limited span of time. In the present invention, test results that are over 90 days are considered stale and are thereafter placed in an expired state. In the event that a client-caller 120 attempts to obtain test result information that has been flagged as expired, an EXPIRED call routing signal is sent from host computer 150 to system 110. Upon receipt of this signal, processing proceeds first to steps 242 and 246 where system 110 plays a recorded message indicating that the client-caller's test results and customer service are no longer available, and thereafter to step 248 where the call is terminated.

If a determination is made in step 240 that the client-caller's test card has not yet been received by testing laboratory 130, an UNRECEIVED call routing signal is sent from host computer 150 to system 110. Upon receipt of this signal, the automated call handler within system 110 plays a recorded message indicating that the specimen was not yet received by the testing laboratory 130 and offering to help the client-caller 120 by transferring the call to a CSR 140. If the client-caller 120 requests a transfer to a CSR, processing proceeds to step 230; otherwise processing proceeds to steps 246 and 248 where a termination message is played and the call is then terminated.

If a determination is made in step 240 that the client-caller's test card has been received by testing laboratory 130, processing proceeds to step 250 where a recorded message indicating the date and time that the test card was received by the testing laboratory 130 will be played for the client-caller 120 by system 110. At this point, a further determination is made by host computer 150 (in step 250) regarding the status of the received specimen. There are three possible status conditions for a specimen that has been received by testing laboratory 130: (i) the specimen is in the process of being evaluated by the lab and evaluation of the specimen has been delayed, (ii) the specimen is in the process of being evaluated by the lab and has not been delayed, or (iii) test results for the specimen have been completed. In the event that a determination is made in step 250 that processing of the specimen has been delayed in the lab, the system proceeds to step 252 where system 110 plays a recorded message for the client-caller 120 indicating that the test result for his or her specimen has been delayed and informing the client-caller 120 of the date and time they should call back to receive their test results. Thereafter, the client-caller is offered a help message giving the client-caller 120 the option of being transferred to a CSR. In the event that the client-caller 120 requests a transfer to a CSR, processing proceeds to step 254; otherwise, a termination message is played in step 258 and in step 260 the call is then terminated.

In the event that a determination is made in step 250 that processing of the specimen is ongoing but has not been delayed in the lab, the system proceeds to step 256 where system 110 provides the client-caller 120 with a recorded message stating that the normal period of time required for processing a specimen and informing the client-caller 120 of the date and time they should call back to receive their test results. Thereafter, a termination message is played in step 258 and in step 260 the call is then terminated.

If a determination is made in step 250 that test results for the specimen have been completed and are therefore available, processing proceeds to step 262. In step 262, a determination is made by host computer 150 as to how to further route the call based on, among other things, the test result to be reported to the client-caller 120 and whether the PIN status database indicates that the client-caller 120 has been flagged to receive counselling announcements. If the client-caller 120 has tested positive, screen positive or inconclusive for the HIV virus, a COUNSELOR call routing signal is sent from host computer 150 to system 110. Upon receipt of this signal, processing proceeds to step 264 where the call is transferred by system 110 to a counselor for handling. In step 264, the counselor reports the positive test result to client-caller 120. In step 264, the counselor may also provide counseling to the client-caller 120, answer questions posed by the client-caller 120 about the HIV virus and AIDs, and provide referral information to client-caller 120.

If a determination is made in step 262 that a positive test result was reported to client-caller 120 during a previous call and during a previous call the client-caller 120 was flagged to receive counselling announcements, an ANNOUNCEMENTS call routing signal is transmitted from host computer 150 to system 110. Upon receipt of this signal, the call is transferred to the automated call handler (in system 110) which (in step 266) plays a recorded message presenting the client-caller 120 with (i) a list of recorded topics for which recorded information is available, and (ii) an option to receive further live counseling. If the client-caller 120 selects an item from the list of recorded topics in step 266, processing proceeds to step 268 where a recorded message providing information on the selected topic is played for the client-caller 120. Following the playing of this recorded message, processing returns to step 266 where the client-caller 120 is again given the opportunity to chose an item from the list of recorded topics or to speak further with a live counselor. In step 270, a record is made in the call history database of each topic area selected by the client-caller 120 in step 266. If during step 266 the client-caller 120 does not select any of the recorded items and does not request transfer to a counselor, a termination message is played in step 272 and in step 274 the call is terminated.

If a determination is made in step 262 that the client-caller 120 has tested negative for the HIV virus, a NEGATIVE call routing signal is transmitted from host computer 150 to system 110. Upon receipt of this signal, system 110 transfers the call to its automated call handler which plays (in step 276) a recorded negative message for the client-caller 120. Based on the length of the time that the client-caller 120 stays on the line during the playing of the recorded negative message, a record is made in the call history database in step 278 indicating the portion of the negative message heard by the client-caller 120. If the client-caller 120 is still on the line when the end of the negative message is reached, processing proceeds to step 282 where a recorded message will be played presenting the client-caller 120 with (i) a list of recorded topics for which recorded information is available, and (ii) an option to receive live counseling. If the client-caller 120 selects an item from the list of recorded topics in step 282, the system proceeds to step 284 where a recorded message providing information on the selected topic is played for the client-caller 120. Following the playing of this recorded message, processing returns to step 282 where the client-caller 120 is again given the opportunity to (i) chose an item from the list of recorded topics, (ii) speak further with a live counselor or (iii) terminate the call. In step 286, a record is made in the call history database of each topic area selected by the client-caller 120 in step 282. If during step 282 the client-caller 120 does not select any of the recorded items and does not request transfer to a counselor, a termination message is played in step 290 and in step 280 the call is terminated.

Although the test result information provided by the present invention is based on an evaluation of a blood specimen provided by the client, it will be understood by those skilled in the art that the present invention may be used to convey confidential medical test results based on the evaluation of other types of biological specimens. In addition, although the preferred embodiment of the present invention as described above is used for conveying test result information indicating whether a client may be carrying the HIV virus, it will be understood by those skilled in the art that the present invention may be used to convey confidential test result information about other medical conditions to clients.

The present invention may be embodied in other specific forms without departing from the spirit or essential attributes of the invention. Accordingly, reference should be made to the appended claims, rather than the foregoing specification, as indicating the scope of the invention.

What is claimed is:

1. In a confidential medical testing system, a method for routing and handling a plurality of in-coming telephone calls initiated by a plurality of anonymous callers, each of said anonymous callers having previously provided a specimen for evaluation to a medical testing laboratory prior to said in-coming calls, comprising the steps of:

(A) receiving a telephone call initiated by an anonymous caller;

(B) prompting said anonymous caller to transmit a personal identification code corresponding to a specimen previously provided to said medical testing laboratory by said anonymous caller prior to placing said telephone call;

(C) receiving said personal identification code;

(D) retrieving, in response to said personal identification code, test result information associated with said specimen previously provided to said medical testing laboratory by said anonymous caller;

(E) selecting, in response to said test result information, a call handler from a plurality of call handlers for processing said telephone call;

(F) routing said telephone call to said selected call handler; and (G) providing said test result information to said anonymous caller with said selected call handler.

2. The method of claim 1, wherein said specimen provided by said anonymous caller is subject to evaluation prior to receiving said telephone call in step (A) in order to determine whether said anonymous caller has a specific medical condition.

3. The method of claim 2, wherein said test result information retrieved in step (D) corresponds to a positive test result if said evaluation of said specimen indicates that said anonymous caller has said specific medical condition, and wherein said test result information retrieved in step (D) corresponds to a negative test result if said evaluation of said specimen indicates that said anonymous caller does not have said specific medical condition.

4. The method of claim 3, wherein said specific medical condition corresponds to the contraction by said anonymous caller of a virus.

5. The method of claim 4, wherein said specimen is a blood specimen and said virus is the HIV virus.

6. The method of claim 3, wherein said plurality of call handlers include at least one live call handler and at least one automated call handler.

7. The method of claim 6, wherein a live call handler is selected in step (E) only if said test result information corresponds to a positive test result.

8. The method of claim 7, wherein an automated call handler is selected in step (E) if said test result information corresponds to a negative test result.

9. The method of claim 1, further comprising the step of verifying said personal identification code against a database of valid personal identification codes after receiving said personal identification code in step (C), and routing said telephone call to said selected call handler in step (F) only if said personal identification code represents a valid personal identification code.

10. In a confidential medical testing system an apparatus for routing and handling a plurality of incoming telephone calls initiated by a plurality of anonymous callers, each of said anonymous callers having previously provided a specimen for evaluation to a medical testing laboratory prior to said in-coming calls, comprising:

(A) means for receiving a telephone call initiated by an anonymous caller;

(B) means for prompting said anonymous caller to transmit a personal identification code corresponding to a specimen previously provided to said medical testing laboratory by said anonymous caller prior to placing Said telephone call;

(c) means for receiving said personal identification code;

(D) means for retrieving, in response to said personal identification code, test result information associated with said specimen previously provided to said medical testing laboratory by said anonymous caller;

(E) means for selecting, in response to said test result information, a call handler from a plurality of call handlers for processing said telephone call;

(F) means for routing said telephone call to said selected call handler; and (G) means for providing said test result information to said anonymous caller with said selected call handler.

11. The apparatus of claim 10, wherein said test result information retrieved by said means for retrieving corresponds to a positive test result if an evaluation of said specimen indicates that said anonymous caller has a specific medical condition, and wherein said test result information retrieved by said means for retrieving corresponds to a negative test result if said evaluation of said specimen indicates that said anonymous caller does not have said specific medical condition.

12. The apparatus of claim 11, wherein said specific medical condition corresponds to the contraction by said anonymous caller of a virus.

13. The apparatus of claim 12, wherein said specimen is a blood specimen and said virus is the HIV virus.

14. The apparatus of claim 11, wherein said plurality of call handlers include at least one live call handler and at least one automated call handler.

15. The apparatus of claim 14, wherein a live call handler is selected by said means for selecting only if said test result information corresponds to a positive test result.

16. The apparatus of claim 15, wherein an automated call handler is selected by said means for selecting if said test result information corresponds to a negative test result.

17. The apparatus of claim 10, further comprising means for verifying said personal identification code against a database of valid personal identification codes after said means for receiving said personal identification code has received said personal identification code, wherein said means for routing is responsive to means for verifying and routes said telephone call to said selected call only if said personal identification code represents a valid personal identification code.

* * * * *